(12) United States Patent
Min

(10) Patent No.: US 12,092,291 B1
(45) Date of Patent: Sep. 17, 2024

(54) STREETLIGHT WITH FUNCTIONS OF SUNLIGHT GENERATION AND STATION FOR DRONES

(71) Applicant: Jonghyun Min, Seoul (KR)

(72) Inventor: Jonghyun Min, Seoul (KR)

( * ) Notice: Subject to any disclaimer, the term of this patent is extended or adjusted under 35 U.S.C. 154(b) by 0 days.

(21) Appl. No.: 18/632,570

(22) Filed: Apr. 11, 2024

(30) Foreign Application Priority Data

Mar. 29, 2024 (KR) ........................ 10-2024-0042980

(51) Int. Cl.
| | |
|---|---|
| *F21S 8/08* | (2006.01) |
| *B60L 53/30* | (2019.01) |
| *B60L 53/53* | (2019.01) |
| *F21S 9/03* | (2006.01) |
| *F21V 23/00* | (2015.01) |
| *F21W 131/103* | (2006.01) |
| *H02S 20/30* | (2014.01) |
| *H02S 40/10* | (2014.01) |

(52) U.S. Cl.
CPC ............. *F21S 8/088* (2013.01); *B60L 53/30* (2019.02); *B60L 53/53* (2019.02); *F21S 9/037* (2013.01); *F21V 23/003* (2013.01); *H02S 20/30* (2014.12); *H02S 40/10* (2014.12); *B60L 2200/10* (2013.01); *F21W 2131/103* (2013.01)

(58) Field of Classification Search
CPC ...... F21S 8/088; F21S 9/037; F21S 8/08–086; H02S 20/30; H02S 40/10; B60L 53/53; B60L 53/30; B60L 2200/10; B64D 47/02; F21V 23/003; F21W 2131/103; B60U 80/20; B60U 70/90–99
USPC ........................................................ 362/410
See application file for complete search history.

(56) References Cited

U.S. PATENT DOCUMENTS

| | | | | |
|---|---|---|---|---|
| 9,387,928 | B1* | 7/2016 | Gentry | .................... B64U 50/37 |
| 9,527,605 | B1* | 12/2016 | Gentry | ................. G05D 1/0094 |
| 2024/0125441 | A1* | 4/2024 | Chiu | ........................ B60L 53/12 |

FOREIGN PATENT DOCUMENTS

| | | | |
|---|---|---|---|
| KR | 101610026 | B1 | 4/2016 |
| KR | 102044225 | B1 | 11/2019 |
| KR | 200497244 | Y1 | 9/2023 |

OTHER PUBLICATIONS

CN-107842802; Fang X, Patent and translation merged; Mar. 27, 2018; Classified: B08B1/04 (Year: 2018).*

* cited by examiner

*Primary Examiner* — Laura K Tso
(74) *Attorney, Agent, or Firm* — Dinsmore & Shohl LLP; Yongsok Choi, Esq.

(57) ABSTRACT

A streetlight includes a support erected vertically on the ground and a lighting unit provided on an upper part of the support and having a lower body and an upper body and emitting light using electrical energy produced by a solar panel. A lamp that receives electrical energy and emits light is installed in the lower body. The upper body includes a plurality of side panels and one upper panel, the upper panel having a solar panel mounted thereon, and being operably coupled to any one of the side panels by a hinge. The following components are accommodated in the upper body: an electric cylinder whose end is connected to the upper panel at the opposite side of the hinge to rotate the upper panel around the hinge to change the tilt angle of the upper panel, a rechargeable battery, a rainwater barrel, a pump.

5 Claims, 4 Drawing Sheets

PRIOR ART

PRIOR ART

STREETLIGHT WITH FUNCTIONS OF SUNLIGHT GENERATION AND STATION FOR DRONES

CROSS-REFERENCE TO RELATED APPLICATIONS

This application claims priority to Korean Patent Application No. 10-2024-0042980 filed on Mar. 29, 2024, the entire contents of which are herein incorporated by reference.

TECHNICAL FIELD

The present disclosure relates to a streetlight with functions of sunlight generation and station for drones.

BACKGROUND

The most commonly used form of street lighting is to emit light by receiving electrical energy through a wire supplied with commercial electricity. In a different way, streetlights incorporating solar power generation technology have emerged to reduce the power consumption of streetlights. These streetlights are composed of a solar module including a solar panel, and a rechargeable battery that stores the electric energy generated therefrom and supplies energy for lighting the lamp. One of the widely known problems in power generation using solar panels is the decrease in solar power generation efficiency due to contamination of the solar panels. These problems inevitably occur in streetlights that use solar modules. A technology has emerged to solve the problem of reduced power generation efficiency due to solar panel contamination in streetlights using solar modules, and one example of this is the Korean utility model registration No. 20-0497244 (title of the invention: Energy saving type solar streetlight). In the prior art of the registered utility model, which adopts a means for solving solar panel pollution, pollution of solar panels is removed using the structure and method as shown in FIG. 1. In FIG. 1, the component indicated by reference numeral 231 is a solar panel, and the component indicated by reference numeral 5 is a transparent cover plate 5 that covers the upper part of the solar panel 231 and can be driven in a sliding manner. The transparent cover plate 5 is located on the top of the solar panel 231, so contaminants such as bird excrement and dust may attach to it. When the driving means drives the transparent cover plate 5 backward in a sliding manner, the transparent cover plate 5 penetrates the hole of the removal member, and at this time, the transparent cover plate 5 and the removal member contact with each other, which results in removal of the contaminants from the transparent cover plate 5. When the transparent cover plate 5 is driven forward again, contaminants separated from the transparent cover plate 5 may be pushed by the forward drive of the transparent cover plate 5 and be blown away by the wind or fall to the ground.

The inventor of the present invention recognized that the problem with the prior art was that the transparent cover plate could easily be deformed. If the transparent cover plate 5 is thermally deformed and bent by solar heat, it may lose contact with the removal member. It may be bent so as not to penetrate the hole of the removal member. In this case, a failure occurs in forward and backward sliding motion. The inventor of the present invention has made efforts to achieve the removal of contaminants on solar panels in a way the can solve these problems.

Furthermore, the inventor of the present invention continued efforts to invent a new design of solar streetlights, which can provide a crime prevention function. As a related prior art, the Korean patent registration No. 10-1610026 (title of the invention: Hybrid crime prevention streetlight system) installs a video camera, emergency button unit, smart pad, voice call unit, etc. on a streetlight, wherein the emergency button unit is pressed in the event of an emergency. As a result, the current situation can be monitored remotely by being connected to the relevant local government and police station, and the reporter's information obtained through the smart pad can be immediately confirmed. However, this street lighting system is focused on crime prevention through cameras and emergency buttons fixed to streetlights, so it is not much different from existing CCTV, and has the disadvantages of not being able to film the crime scene outside the filming range. To solve this problem, a technology to prevent crime by incorporating drones into streetlights has been proposed by the Korean patent registration No. 10-2044225 (title of the invention: Streetlight for crime prevention and security with CCTV drone at the head). A diagram of the prior art is shown in FIG. 2. In the prior art of FIG. 2, an electromagnet is installed on the head of a streetlight and a permanent magnet is installed on the drone, so that the crime prevention drone is mounted on the head of the streetlight in a non-contact manner by magnetic force.

Although this non-contact mounting method of a crime prevention drone may have its own advantages, the inventor of the present invention recognized a problem of the prior art, that a significant amount of electrical energy is required to maintain the drone mounted at the head part of the streetlight. It was recognized that the prior art method of FIG. 2, which inevitably requires a lot of energy to mount and maintain the drone, is not suitable for solar power generation streetlights for energy savaging or eco-friendly energy use. In addition, there were questions to the stability of the method using magnetic for securing and maintaining expensive crime prevention drones. The inventor of the present invention thought that the most stable way would be to provide a horizontal station and have the drone land on it. Accordingly, the inventor of the present invention found that by using a flat and wide solar panel as a crime prevention drone mounting station, it could be possible to maintain improve stability of mounting the drone, and at the same time, it could provide a charging station function by connecting a rechargeable battery to the drone.

SUMMARY

An object of the present disclosure is to provide a streetlight that can continuously maintain the efficiency of solar power generation by removing contaminants attached to the solar panel.

Also, an object of the present disclosure is to provide a streetlight that functions as a seating and charging station for drones, in particular crime prevention drones.

Further, an object of the present disclosure is to provide a streetlight that can perform the above-described complex functions, while having a structure as simple as possible, so that a high possibility of commercial implementation is guaranteed.

The present disclosure relates to a streetlight. A streetlight according to an embodiment of the present disclosure includes a support erected vertically on the ground and a lighting unit provided on an upper part of the support and having a lower body and an upper body and emitting light using electrical energy produced by a solar panel. A lamp that receives electrical energy and emits light is installed in the lower body. The upper body comprises a plurality of side panels and one upper panel, the upper panel having a solar panel mounted thereon, and being operably coupled to any one of the side panels by a hinge. The following components are accommodated in the upper body: an electric cylinder whose end is connected to the upper panel at the opposite side of the hinge to rotate the upper panel around the hinge to change the tilt angle of the upper panel, a rechargeable battery storing electrical energy produced by the solar panel, a rainwater barrel storing rainwater collected through rainwater collection holes provided near the hinge of the upper panel, a pump pressurizing rainwater from the rainwater barrel and supplying rainwater to nozzles positioned around the edges of the upper panel to direct towards the solar panel, and a control unit. The control unit performs the following controls: a control providing electrical energy of the rechargeable battery to the lamp, a control actuating the pump so that the nozzles spray rainwater towards the solar panel, and a control actuating the electric cylinder so that the tilt angle of the upper panel is changed. The control unit can operate the electric cylinder at a set time to change the tilt angle of the upper panel according to pre-entered data on the optimal solar panel tilt angle for each time considering the varying altitude of the sun. Further, the control unit includes a drone station mode control function. In the drone station mode control, the control unit actuates the electric cylinder so that the upper panel is maintained horizontally to the ground. In the drone station mode control, a drone can be seated on the upper panel in a state that the upper panel is maintained horizontally to the ground, and electrical energy is supplied to the drone from the rechargeable battery through a charging terminal. Further, the streetlight according to the present disclosure may further include other additional configurations.

According to the present disclosure, it is possible to provide a streetlight that can continuously maintain the efficiency of solar power generation by removing contaminants attached to the solar panel.

Also, according to the present disclosure, it is possible to provide a streetlight that functions as a seating and charging station for drones, in particular crime prevention drones.

Further, according to the present disclosure, it is possible to provide a streetlight that can perform the above-described complex functions, while having a structure as simple as possible, so that a high possibility of commercial implementation is guaranteed.

DETAILED DESCRIPTION

The following detailed explanation of the present disclosure will be provided with reference to the accompanying drawings, which illustrate certain embodiments in which the present disclosure may be carried out as an example. These embodiments will be described in detail so that those skilled in the art can carry out the present disclosure. It should be understood that various embodiments of the present disclosure need not be mutually exclusive but not necessarily mutually exclusive. For example, certain shapes, structures, and characteristics described herein may be implemented with changes from an embodiment to other embodiments without departing from the spirit and scope of the present disclosure in connection with an embodiment. It should also be understood that the location or placement of individual components in each disclosed embodiment can be varied without departing from the spirit and scope of the present disclosure. Thus, the following detailed description is not intended to be taken as a restrictive sense, and the scope of the present disclosure is limited only by the appended claims along with all ranges which are equivalent to those claimed.

Hereinafter, various preferred embodiments of the present disclosure will be described in detail with reference to the accompanying drawings to enable those skilled in the art to easily implement the present disclosure.

Figure 1:
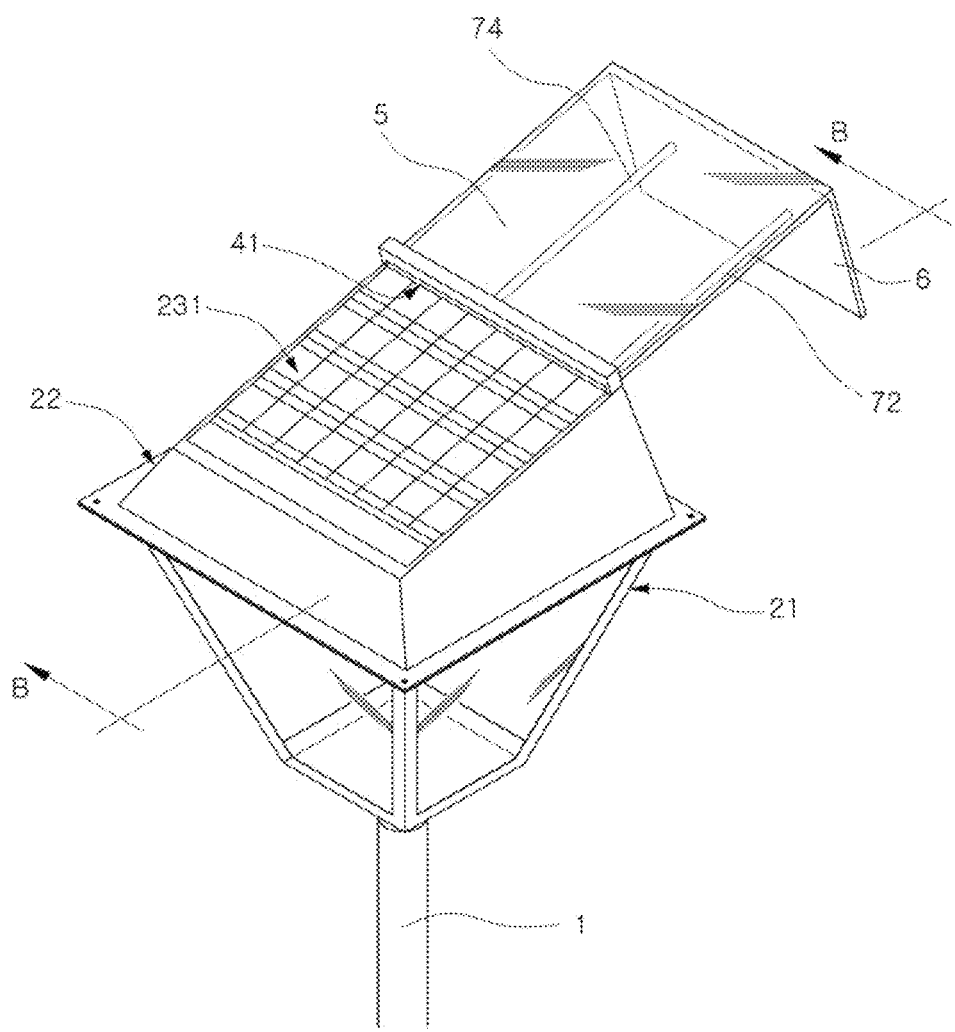
FIGS. 1 and 2 depict prior art streetlights.
Figure 2:
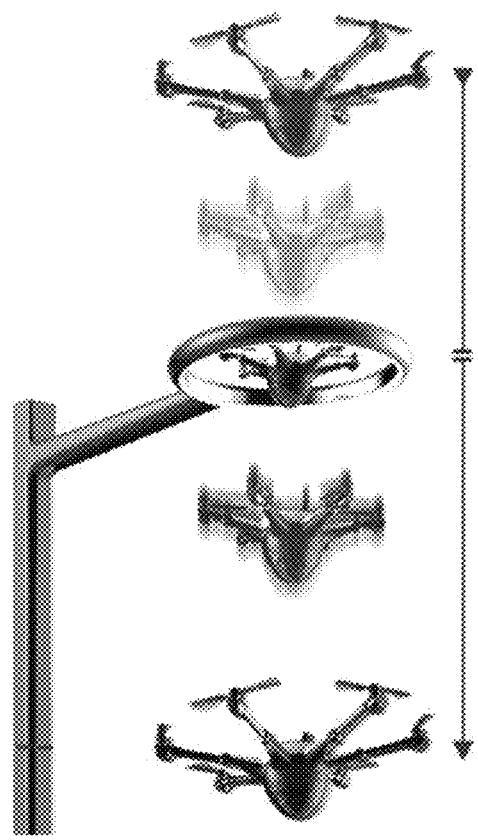
Figure 3:
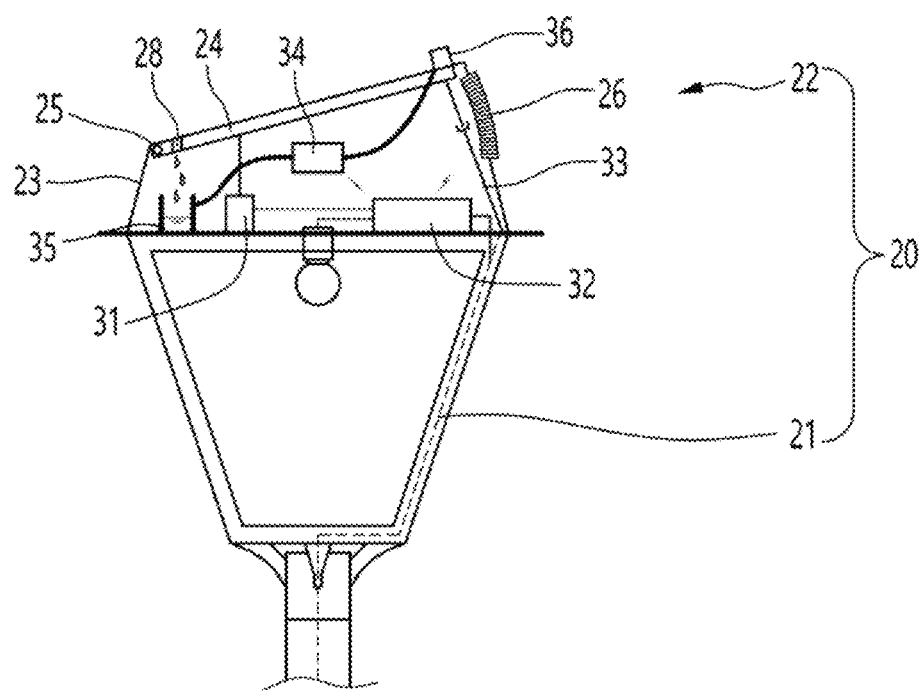
FIG. 3 is a cross-sectional view of a streetlight according to an embodiment of the present disclosure.

FIG. 3 is a cross-sectional view of a streetlight according to an embodiment of the present disclosure. In FIG. 3, reference numeral 10 indicates a support and reference numeral 20 indicates a lighting unit. The lighting unit 20 includes a lower body 21 and an upper body 22. A lamp is installed in the lower body 21. The upper body includes four side panels 23 and one top panel 24. The top panel 24 is operably coupled to one of the side panels 23 by a hinge 25. By comparing the state shown in FIG. 3 with the state shown in FIG. 5, the variable operating state of the upper panel 24 coupled to one of the side panels 23 by the hinge 25 can be understood easily. Sine the side panel 23 is fixedly installed, an empty space may exist between the top panel 24 and the side panel 23 when the inclination angle of the top panel 24 changes. If external foreign matter such as rainwater enters the upper body 22 through this empty space, it may cause malfunction of the internal devices of the upper body 22. Therefore, it is desirable that the space between the top panel 24 and the side panel 23 by sealed. In order to seal the space between the top panel 24 and the side panel despite the variable operation of the top panel 24, the side bellows 26 are installed around all three sides excluding the side where the hinge is installed. From the cross-sectional view of FIG. 3, the bellows 26 installed between the top of the side panel 23 and the upper panel 24 can be seen. In this way, the appearance of the bellows 26 installed around the three sides is similar to that of an accordion, which is a musical instrument. A solar panel 27 is installed on the top of the upper panel. Inside the upper body 22, the following various functional parts are accommodated to achieve the purpose of the present invention.

A rechargeable battery (31) stores electrical energy from the solar panel 27. The electrical energy of the rechargeable battery can be transmitted the lamp located in the lower body 21 via a control unit 32. Also, the control unit 32 can transmit the electrical energy to an electric cylinder. The electric cylinder 33 has one end connected to the side of the upper panel 24 opposite to the side on which the hinge 25 is installed, and functions to tile the upper panel 24 clockwise or in the opposite direction around the hinge 25. Another functional unit whose operation is controlled by the control unit 32 is a pump 34. The pump 34 functions to supply water accumulated in the rainwater barrel 35 to a nozzle 36 and spray water at high pressure from the nozzle 36. The nozzle 36 is installed around the upper surface of the upper panel 24 to face the solar panel 27. In FIG. 3, the nozzle 36 is shown as being installed only around the rear of the upper panel 24, but it may be installed around one or more sides of the upper panel 24 as long as it is aimed at the solar panel 27. It is preferable that the rainwater barrel 35 is equipped with a water lever determination sensor. When there is no water in the rainwater barrel 35, operating the pump 34 at regular time intervals is a waste of energy and may result in pump failure due to continued idling. Accordingly, the signal from the water level determination sensor is connected to the control unit 32, and the control unit 32 can determine the operation of the pump 34 based on this signal. The rainwater barrel 35 equipped with the water level determination sensor can also function as a kind of rain gauge. The degree of increase in the water lever of the rainwater barrel 35 measured during a certain time interval may be measured by the water level determination sensor and transmitted to the outside place, e.g., a weather station, through a communication module that may be additionally provided in the streetlight according to an embodiment of the present invention.

Figure 4:
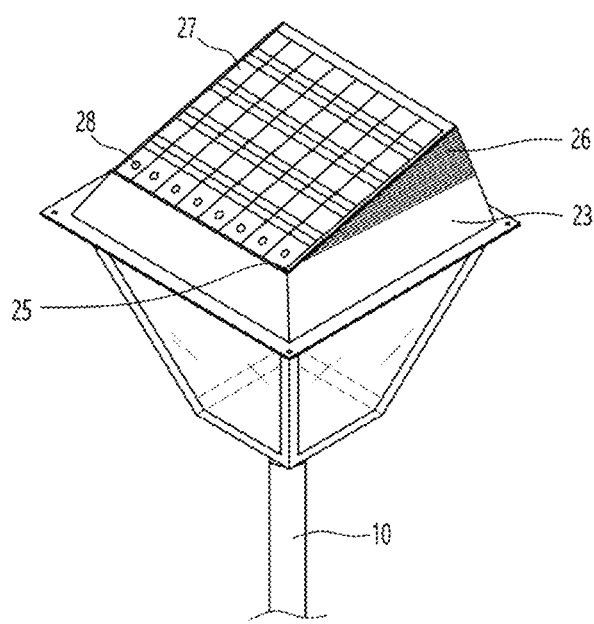
FIG. 4 is a perspective view of a streetlight according to an embodiment of the present disclosure.

FIG. 4 is a perspective view of a streetlight according to an embodiment of the present disclosure. From FIG. 4, it is possible to see how the bellows 26 connects the bottom of the top panel 24 and the top of the side panels 23 while the top panel 24 is spaced apart from the side panels 23. Since the bellows 26 surrounds the three sides of the side panels 23, it can effectively block the intrusion of foreign substances. From FIG. 4, the appearance of the rainwater collection hole 28 can be confirmed. The rainwater collection hole 28 provided near the hinge located at the lowermost of the inclined upper panel 24 can effectively collect rainwater flowing down the slope. The rainwater collection hole 28 and the rainwater barrel 35 are connected through a known hose, etc., so that the rainwater collected from the rainwater collection hole 28 is stored only in the rainwater barrel 35 without leaking elsewhere.

Figure 5:
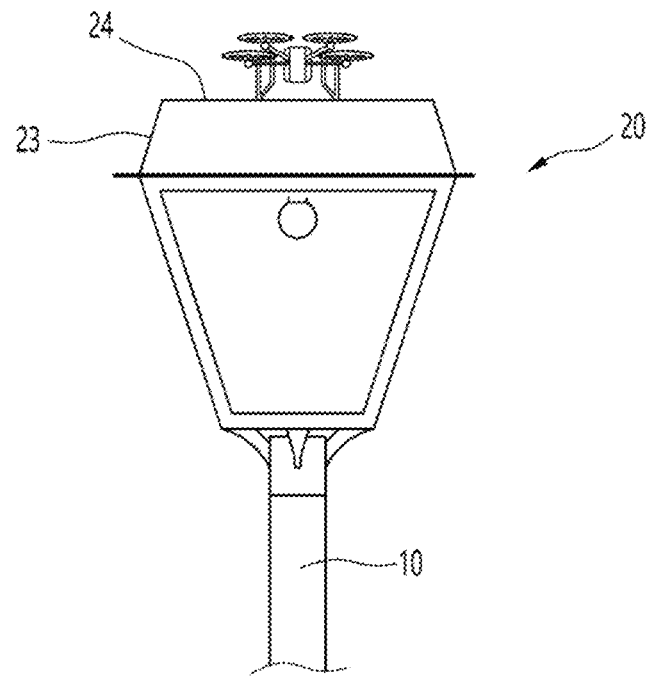
FIG. 5 is a conceptual diagram showing a drone station mode of a streetlight according to an embodiment of the present disclosure.

FIG. 5 is a conceptual diagram showing a drone station mode of a streetlight according to an embodiment of the present disclosure. A streetlight according to an embodiment of the present invention can function as a drone station where drones used for various purposes can land. An example of such a drone could be a crime prevention drone. Crime prevention drones can perform regular patrol functions by periodically flying over a specific area and can also dispatched when an emergency signal occurs and transmit the situation in the area to the control center in real time. When there is a danger of the drone discharging, it must return to the place where it was launched, so there exists a considerable restriction on the flight radius. If one of the nearby streetlight functions as a station for the drone, it will be able to land on the streetlight while charging and continue the crime prevention activities without returning to the base, which will result in a maximization of the crime prevention function.

In the drone station mode of the streetlight, the control unit 32 controls the electric cylinder 33 to adjust the tilt of the upper panel 24. At this time, the upper panel 24 is maintained horizontal to the ground, allowing the flying drone to land stably on the upper panel 24 and the solar panel mounted on the upper panel 24. When the drone lands, the control unit 32 can connect the charging terminal to the charging port of the drone. As an alternative, it would also be possible to connect the drone's charging port to a charging terminal fixed to the upper panel 24 of the streetlight. As described above, the control of the electric cylinder 33 by the control unit 32 adjusts the tilt angle of the upper panel 24 to make it horizontal with the ground, thereby allowing the drone to land and be maintained safely. In addition to the function, it can also be performed for the purpose of increasing the efficiency of solar power generation by the solar panel 27. Generally, solar panels are installed on streetlights at a fixed angle toward the sun, but in the present invention, the angle at which the solar panel is oriented toward the sun can be changed. The solar panel of the present invention can be tilted in consideration of the ever-changing altitude of the sun. The tilt angle can be adjusted to the optimal angle. Since the optimal tilt angle of the solar panel for each time point can be set in advance, the control unit 32 can control the electric cylinder 33 to achieve the predetermined tilt angle of the solar panel for each time point. Such a feature should be understood as a unique feature of the present invention that differentiates it from streetlights equipped with prior art solar panels.

It is possible to clean the camera part of the drone while the drone is seated on the top panel 24, which is in a flat state. One of the main purposes of the crime prevention drones is to transmit video information about crime scenes to a control center. Since crime video information cannot be properly obtained if contaminants are attached to the camera unit that performs the eye function of a crime prevention drone, removal of contaminants from the camera unit is important. In the station mode of the drone, that is, in a state where the drone is seated on the upper panel 24 of the streetlight, the control unit 32 can control the pump 34 to spray water under pressure from the nozzle 36. It would be possible to perform accurately aimed spraying by turning the nozzle 36 toward the camera unit of the seated drone, but in this case, components for controlling the nozzle 36 need to be added, increasing the cost. Therefore, when the purpose is to perform a cleaning function on a drone seated in the drone station mode, a plurality of nozzles 36 that are not posture controlled are arranged along the edge of the upper panel 24, so that simultaneous spraying is performed from all nozzles to clean the camera unit of the drone.

The streetlight may be configured so that the upper panel 24 or the electric cylinder 33 connected to the upper panel additionally includes a shock sensor or a weight detection sensor. In this case, it is possible to detect whether a drone has been seated in the drone station mode. At this time, the streetlight control unit can notify the control center of the landing of the drone through a communication module that may be additionally included, and when a command to perform cleaning of the drone is received from the control center, the control unit of the streetlight can operate the pump to spray water from nozzles under pressure to clean the drone, in particular, the camera unit of the drone.

Figure 6:
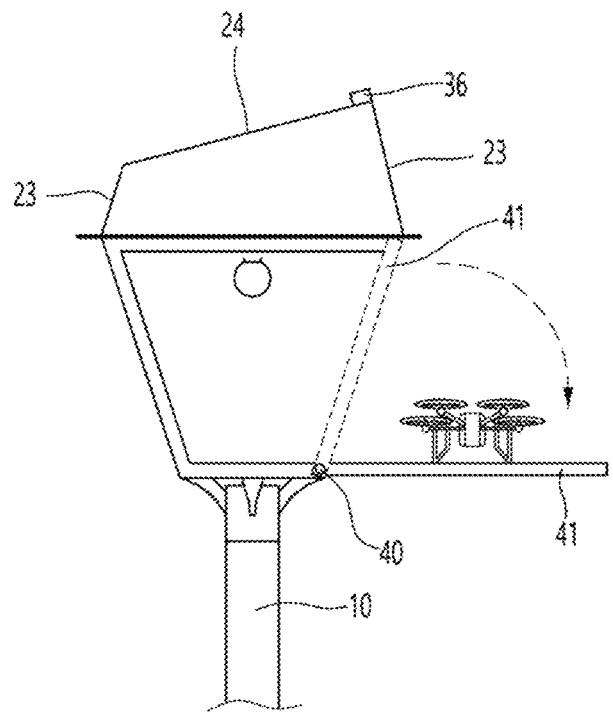
FIG. 6 is a conceptual diagram showing a drone station mode of a streetlight according to another embodiment of the present disclosure.

FIG. 6 is a conceptual diagram showing a drone station mode of a streetlight according to another embodiment of the present disclosure. In this embodiment, the upper panel 24 of the upper body of the streetlight does not operate around the hinge, unlike the previously described embodiment. Except that the tilt angle of the upper panel 24 is fixed, the configuration for removing contaminants from the solar panel 27 installed on the upper panel 24 is the same as that in the previously described embodiment.

In this embodiment, the movable part for providing a horizontal seating station for drones in installed in the lower body 21. As shown in FIG. 6, any one of the four side panels is opened by rotating around the hinge n40, so that the side panel 41 of the lower body 21 functions as a horizontal seating station for drones. To this end, the hinge 40 may be provided as a type that provides rotational torque to the connected side panel 41 by receiving electrical energy. In addition, a structure in which a rope is connected to the upper part of the side panel 41, which can be opened by a hinge operation, and the side panel can be opened or closed by the forward or reverse rotation of the electric motor winding or unwinding the rope, can be constructed by utilizing the known technology at the time of filing the present application.

Preferably, the electric hinge 40 or the electric motor of the lower body 21 opens or closes the side panel 41 by receiving electrical energy from the rechargeable battery 31 through the control unit 32 installed inside the upper body 22. In the open state of the side panel 41, which maintains a horizontal state, the drone can be seated on the side panel 41. As in the previously described embodiment, a charging terminal is connected to the drone seated on the open side panel 41, so that the drone can be charged in the seated state. However, in this embodiment, cleaning of contaminants from the drone by spraying water on the seated drone is not performed. In contrast to the previously described embodiment, the drone does not block the solar panel in the station mode of the drone. Therefore, the efficiency of the solar power generation does not decrease when the drone is seated, which is evaluated as an advantage of the present embodiment compared with the previously described embodiment. Meanwhile, in this embodiment, since the inclined angle of the upper panel 24 of the upper body 22 is not changed, the gap between the upper panel 24 and the side panel 23 does not need to be movably sealed, thus the bellows 26 is not adopted.

In terms of enhancing the streetlight's drone station function, the configuration of the above described two different embodiments may be applied to the streetlight at the same time. That is, a horizontal position on which the drone can land may be provided by adjusting the tile of the upper panel 24 of the upper body 22 on which the solar panel is installed, and at the same time, may be also provided by the open side panel 41 of the lower body 21. It is difficult to grant the drone station function to all streetlights due to cost constraints, the above-described drone station function may only be granted to a small number of streetlights installed in a specific area. In this case, it would be efficient to enable the selected streetlights to perform functions of seating and charging for as many drones as possible, that is, to provide processing capacity for more drones. In terms of maximizing the function as a drone station, not only one of the side panels 41 of the lower body 21 is opened, but a plurality of side panels 41, and even all side panels are opened, so that the lower body 21 of the streetlight provides a plurality of drone stations.

While the present disclosure has been described in the foregoing by way of embodiments and drawings which are defined with specific matters such as specific components and the like, this is only the one provided to aid in a more general understanding of the present disclosure, and the present disclosure is not limited to the above embodiments, and various modifications and variations can be made from the substrate to those skilled in the art to which the present disclosure pertains.

Accordingly, the spirit of the present disclosure should not be defined as limited to the embodiments described above, and all that have been equivalently or equivalently modified with the claims to be described below, as well as those to be within the scope of the spirit of the present disclosure.

What is claimed is:

1. A streetlight including a support erected vertically on a ground and a lighting unit provided on an upper part of the support and having a lower body and an upper body and emitting light using electrical energy produced by a solar panel, characterized in that:
   a lamp that receives electrical energy and emits light is installed in the lower body,
   the upper body comprises a plurality of side panels and one upper panel, the upper panel having a solar panel mounted thereon, and being operably coupled to any one of the side panels by a hinge, and
   in the upper body,
   an electric cylinder whose end is connected to the upper panel at the opposite side of the hinge to rotate the upper panel around the hinge to change a tilt angle of the upper panel,
   a rechargeable battery storing electrical energy produced by the solar panel,
   a rainwater barrel storing rainwater collected through rainwater collection holes provided near the hinge of the upper panel,
   a pump pressurizing rainwater from the rainwater barrel and supplying rainwater to nozzles positioned around edges of the upper panel to direct towards the solar panel, and
   a control unit are accommodated,
   the control unit performs,
   a control providing electrical energy of the rechargeable battery to the lamp,
   a control actuating the pump so that the nozzles spray rainwater towards the solar panel, and
   a control actuating the electric cylinder so that the tilt angle of the upper panel is changed,
   the control unit operates the electric cylinder at a set time to change the tilt angle of the upper panel according to pre-entered data on an optimal solar panel tilt angle for varying altitude of the sun,
   the control unit includes a drone station mode control function,
   in the drone station mode control, the control unit actuates the electric cylinder so that the upper panel is maintained horizontally to the ground,
   in the drone station mode control, a drone can be seated on the upper panel in a state that the upper panel is maintained horizontally to the ground, electrical energy is supplied to the drone from the rechargeable battery through a charging terminal.

2. The streetlight of claim 1, wherein the control unit controls the pump so that the nozzles spray rainwater at a predetermined time interval.

3. The streetlight of claim 2, wherein the rainwater barrel comprises a water level determination sensor, a signal from the water level determination sensor is transmitted to the control unit, and the control unit does not actuate the pump in spite of reaching a predetermined time point if the water level determination sensor transmits a signal that the rainwater barrel is empty.

4. The streetlight of claim 3, wherein a bellows side wall is installed between top sides of the side panels excluding the side where the hinge exists and bottom side of the upper panel.

5. The streetlight of claim 4, wherein the lower body comprises a plurality of side panels, and the one or more side panels of the lower body can open or close through an electric hinge applying rotational torque by receiving electrical energy from the rechargeable battery in the upper body, and when the one or more side panels of the lower body are opened by the electric hinge to be horizontal to the ground, one or more drones can seat on the opened horizontal side panels resulting in enhancing a drone processing capacity in the drone station mode.

\* \* \* \* \*